United States Patent
Yasuda et al.

(10) Patent No.: US 6,566,865 B2
(45) Date of Patent: May 20, 2003

(54) NON-CONTACT ROTATIONAL DISPLACEMENT DETECTING DEVICE

(75) Inventors: Keiji Yasuda, Handa (JP); Hisayoshi Okuya, Nishio (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/988,677

(22) Filed: Nov. 20, 2001

(65) Prior Publication Data
US 2002/0060564 A1 May 23, 2002

(30) Foreign Application Priority Data
Nov. 20, 2000 (JP) ........................................ 2000-353192

(51) Int. Cl.⁷ .................................................. G01B 7/14
(52) U.S. Cl. ............................... 324/207.2; 324/207.25; 439/534
(58) Field of Search ...................... 324/207.2, 207.25, 324/207.24, 207.22, 251, 173, 174, 260, 262; 338/32 H, 32 R; 340/868; 439/11, 534

(56) References Cited
U.S. PATENT DOCUMENTS 6,188,216 B1 * 2/2001 Fromer .................... 324/207.2
6,252,394 B1   6/2001 Roze et al.
6,323,641 B1 * 11/2001 Allwine ................... 324/207.2
6,411,082 B2 * 6/2002 Glasson ................. 324/207.25

FOREIGN PATENT DOCUMENTS

| DE | 42 16 344 A1 | 5/1992 |
| DE | 44 05 910 A1 | 2/1994 |
| DE | 198 57 017 A1 | 12/1998 |
| JP | 2-122205 | 1/1988 |

* cited by examiner

Primary Examiner—Edward Lefkowitz
Assistant Examiner—Subhash A Zaveri

(57) ABSTRACT

A non-contact displacement detecting device including a permanent magnet fixed with a rotational member, a sensor portion fixed with a non-rotational member, and the sensor portion detects a displacement of a detected object connected with the shaft. The non-contact displacement detecting device includes a housing for supporting the rotational member rotatably and restricting one movement of the rotational member in an axial direction, and a holder for contacting with the rotational member at a plurality of contact points and restricting another movement of the rotational member in the axial direction. Thereby, the movement of the rotational member in the axial direction is restricted by the holder and the housing.

3 Claims, 2 Drawing Sheets

NON-CONTACT ROTATIONAL DISPLACEMENT DETECTING DEVICE

FIELD OF THE INVENTION

This invention relates to a non-contact displacement detecting device, particularly, this invention relates to a bushing mechanism of a rotational member.

BACKGROUND OF THE INVENTION

Conventionally, a non-contact displacement detecting device (e.g., non-contact detecting sensor) includes a rotational shaft fixed with a detected object, the rotational shaft is fixed with a permanent magnet, and a Hall element (e.g., Hill IC) is disposed facing the permanent magnet with a predetermined clearance. When the detected object rotates, the permanent magnet fixed with the rotational shaft is rotated as well. As a result, a magnetic flux closing over the Hall element changes, and the sensor detects a movement of the rotational shaft by detecting a change of the magnetic flux.

For example, the non-contact displacement detecting device such as this is disclosed in Japanese Patent laid open No. Hei 02 (1990)-122205. The publication discloses a rotational shaft inserted into a housing made of resin with a bushing function. One end portion of the rotational shaft is fixed with the cross-sectional approximately U-shaped a magnet holder with the permanent magnet at a inner surface thereof. Movement in one axial direction of the rotational shaft is restricted by the boss portion at the center of the housing; with movement in another axial direction of the rotational shaft, a groove portion is formed on an outer surface of the rotational shaft so as to be restricted by an end portion of an opposite side of the boss portion in which the rotational shaft is inserted. The non-contact displacement detecting device includes a restricting mechanism restricted in the movement of the axial direction of the rotational shaft by fitting a clip in the groove portion.

However, when the movement in one axial direction is restricted by the boss portion of the housing and the magnet holder, the movement in another direction is restricted by the clip fitting at the groove portion of the rotational shaft. A groove proofing on the rotational shaft, and extra parts (e.g., a clip restricting the movement of the rotational shaft in the axial direction and a ring member etc) are needed. As a result, the cost of the non-contact displacement detecting device is increased.

SUMMARY OF THE INVENTION

In view of the foregoing, it is an object of the invention to provide a restriction for the movement of the rotational shaft in the axial direction with a low cost construction.

According to the present invention, a non-contact displacement detecting device including a rotational member, a non-rotational member relatively rotatable with the rotational member, a permanent magnet fixed with one of the rotational member and the non-rotational member, a sensor portion fixed with the other rotational member and the non-rotational member and detecting displacement between the rotational member and the non-rotational member. The non-rotational member has a housing and a holder fixed to the housing; the housing supports the rotational member rotatably and restricts one axial direction movement of the rotational member. The holder forms a plurality of contacting points in contact with the rotational member, and restricts the other axial movement of the rotational member.

According to a first aspect of the present invention, as the non-contact displacement detecting device includes a housing for supporting the rotational member rotatably and restricting a movement in one axial direction of the rotational member, and a holder for contacting an end portion of the rotational member at a plurality of contact points for the rotational member and restricting a movement in the other axial direction, the movement of the rotational member in the axial direction is restricted. Further, as the end portion of the rotational member contacts the holder at a plurality of contact points, the movement of the rotational member in the axial direction is regulated, and a friction force between the rotational member and the holder can be reduced. Accordingly, since conventional groove processes for the rotational member and extra parts (e.g., clip, etc.) for restricting the movement of the rotational member are not needed so as to restrict the movement of the rotational member in the axial direction, the device can be made at a low cost.

According to a second aspect of the present invention, the rotational member includes a magnet supporting portion for supporting the permanent magnet, the holder including an opening in which the rotational member is disposed, and a restricting portion for contacting an end portion of the magnet supporting portion on an inner portion of the opening. Thereby, a movement in one axial direction of the rotational member is restricted by the end portion of the housing in the axial direction, a movement in another direction is restricted by the restricting portion formed at the inner portion of the opening of the holder, the movement in the axial direction can be regulated by a simple construction. Further, as the end portion of the magnet supporting portion in the axial direction contacts with the housing, the movement of the rotational member in the axial direction can be restricted, whereby a device having a large number of parts is not needed, and the movement in the axial direction can be restricted with a simple construction.

BRIEF DESCRIPTION OF THE DRAWINGS

The features and advantages of a non-contact displacement detecting device according to the present invention, and others, will be more clearly appreciated from the following description considered in conjunction with the accompanying drawing figures in which like elements bear like reference numerals and wherein.

DETAILED DESCRIPTION OF PREFERRED EMBODIMENTS OF THE INVENTION

Figure 1:
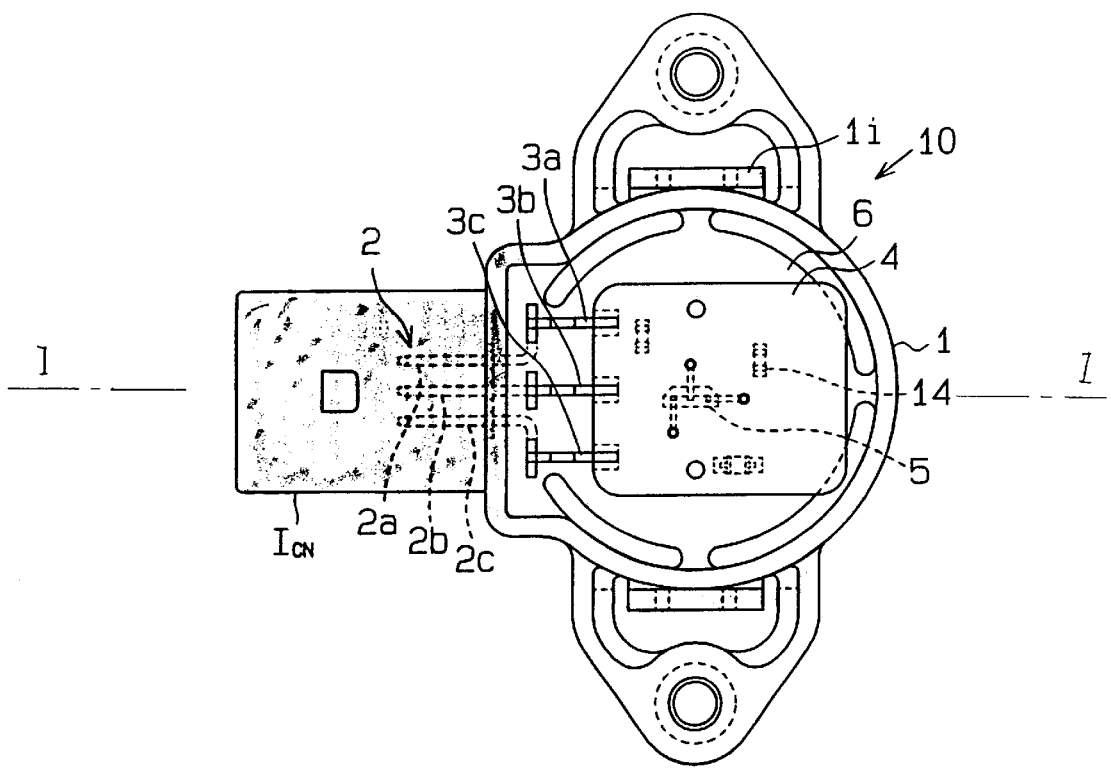
FIG. 1 is a top view of a non-contact displacement detecting device according to an embodiment of the present invention.

Hereinafter, a preferable embodiment of the present invention will be described referring to FIGS. 1 and 2.

The non-contact displacement detecting device (displacement sensor) 10 includes a rotational shaft 9 as a rotational member, a non-rotational member 1, 11 relatively rotatable with the rotational shaft 9, a permanent magnet 7 fixed with the rotational shaft 9, a sensor portion 5 fixed with the non-rotational member 1, 11 and detecting displacement between the rotational shaft 9 and the non-rotational member 1, 11. The non-rotational member has a housing 11 and a holder 1 fixed with the housing 11. The housing 11 supports the rotational shaft 9 rotatably and restricting one of axial direction movement of the rotational shaft 9.

Figure 2:
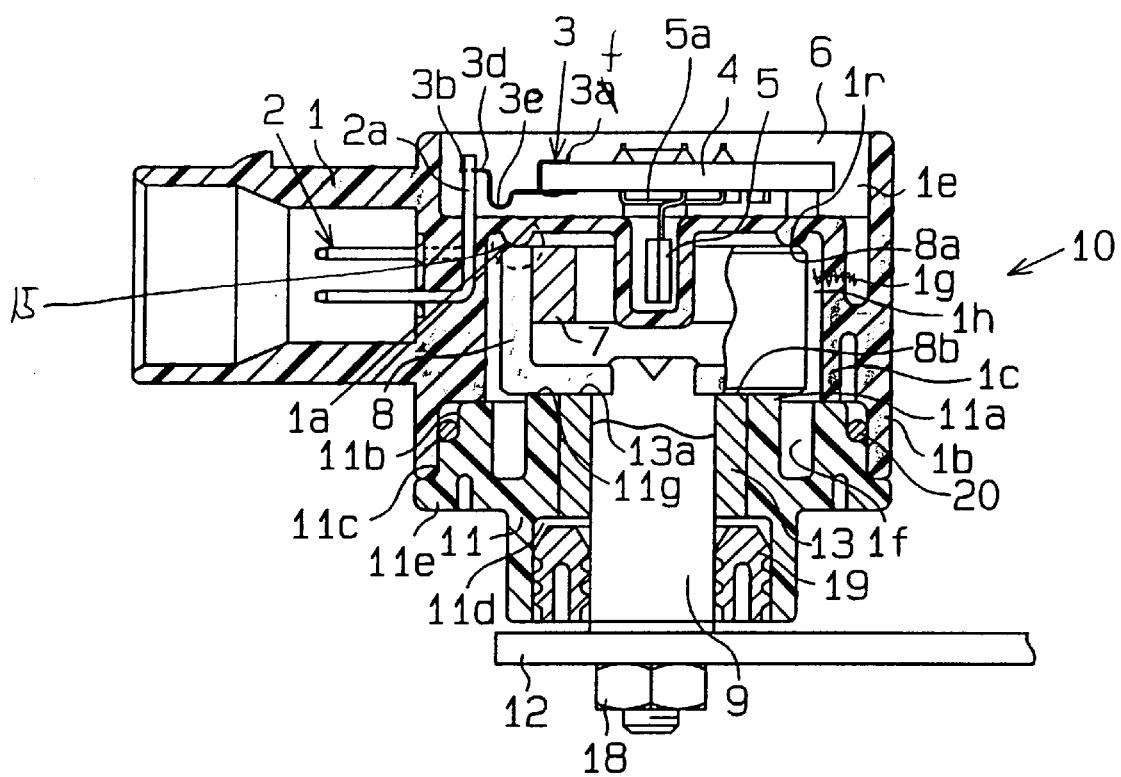
FIG. 2 is a cross-sectional view of the non-contact displacement detecting device along the plane I—I according to an embodiment of the present invention.

FIG. 1 is a top view of a displacement sensor 10 showing a construction of a sensor portion 5. In this embodiment, a Hall element is used as the sensor portion. In FIG. 1, a holder 1 is made of resin, the holder 1 is cylindrically shaped, a flange forms two mounting holes on both sides of the holder 1, and includes a connector portion 1CN on a left side shown in FIG. 1. Three terminals 2 (2a, 2b, 2c) are disposed in the holder 1 by an insert forming, the connector portion 1CN includes a power supply terminal, an earth terminal, and a signal terminal at an inner side. An end portion of the terminal 2 of the connector 1CN projects in an opening of the inner side of the connector 1CN. When an external connector (not shown) fits in the connector portion 1CN, the displacement sensor 10 establishes a power supply, and the output signal is generated from the displacement sensor 10 for an outside displacement sensor 10.

The terminal 2 extending from the connector portion 1CN is approximately L-shaped, the terminal 2 projects in an opening 1e of an upper portion of the holder 1. A notch is formed at the center of each upper end of the terminal 2 projecting in the opening 1e, each of three terminals 3 (3a, 3b, 3c) fitted in a corresponding notch respectively, and a contact point between the pair of each notch and each terminal is fixed by solder. One end of the terminal 3f fixed with the substrate 4 is approximately U-shaped so as to clip the substrate 4 at one end of a substrate side, and the terminal 3 is fixed with the substrate 4 by solder. Another end of the terminal 3b has two curvature portions 3e, 3d on the way such that another end portion projected in the upper opening 1e of the terminal 2 is crossed over the terminal 2 and connected electrically.

The tip shaped electronic parts of a Hall element 5, a resister, a condenser, etc. are mounted predetermined positions by solder bonding etc. on the substrate 4 made of glass-epoxy resin. So when the external connector fits in the connector portion 1CN, the power supply is supplied from the connector portion 1CN for the sensor 10, the Hall element 5 is supplied with a predetermined voltage (e.g., 5V), and an outputted signal from the Hall element 5 is derived from the external connector. As above-mentioned, when the substrate 4 is disposed in the holder 1, the Hall element 5 is disposed in a concave portion formed at the center of the opening 1e on the upper portion of the holder 1. When the Hall element 5 is disposed in the concave portion of the holder 1, a bottom surface of the opening 1e on the upper portion of the holder 1 and the substrate 4 comes to a parallel relationship. The substrate 4 including the Hall element 5 such as this is fitted in the upper opening 1e so as to guard electronic parts in the opening 1e of the upper portion by resin 6. The opening 1e is sealed by resin 6.

Further, the holder 1 has an opening 1h and an opening 1f on a lower portion, and an opening area of the opening 1f is larger than the opening area of the opening 1h in a plane view from the top. Two circumferential walls (an outer wall 1b and an inner wall 1c) is formed on the outside of the opening 1h. The outer wall 1b forms the opening 1f, and the outer wall 1b is longer than the inner wall 1c in the axial direction. The outer wall 1b becomes thin from the height of the bottom end portion of the inner wall 1c shown in FIG. 2 to a lower direction, and a circular concave portion 1g is formed between the outer wall 1b and the inner wall 1c. Further, a restricting portion 1r including a spherical-shaped projection is formed on the holder 1 at a plurality of points (e.g., three points) of the top portion of the opening 1h.

On the other hand, the housing 11 made of resin and covering the openings 1h, 1f at the lower position of the holder 1 has a step shaped on the outside diameter of the housing 11. The boss portion 11a is formed on an upper portion of the housing 11 in the axial direction shown in FIG. 2. The inner wall 11b lower than the boss portion 11a and an outer wall 11c lower than the inner wall 11b is formed in the axial direction, and a flange lie is formed in a radial direction on the outer surface of the housing 11.

In the holder 1 and the housing 11 assembly, the outside diameter of the holder 1 contacts with the flange 11e, a diameter of the flange 11e in a clockwise direction corresponds with the a diameter of a cylindrical portion of the holder 1, an outer surface of the outer wall 11c connects to an inner surface of the outer wall 1b. Further, a bottom end portion of the inner wall 1c of the holder 1 contacts to the upper end portion of the inner wall 11b of the housing 11 in the axial direction.

The boss portion 11a is formed around a center of housing 11, and the bushing 13 is made of metal material (e.g., sintered metal including copper series material which provides good abrasion resistance on the boss portion 11a via an insert forming or pressed in the housing 11). The bushing 13 is fixed to the housing 11. The bushing 13 is covered with resin material in the axial direction, and a concave portion (opening) lid is formed at one end (a lower side) of the housing 11 in the axial direction.

The rotational shaft 9 made of metal material is inserted into the bushing 13 of the housing 11. On the other hand, a cross sectional U-shaped cup 8 fixed to a ring shaped permanent magnet 7 including a pair of N- and S-poles magnetized so as to abut each other is fixed with the rotational shaft 9 by adhesive, etc., at an inner side of the upper portion of the rotational shaft 9. Further, the cup 8 functions as a yoke on a magnetic circuit made of magnet material. Furthermore, according to a coupling between the rotational shaft 9 and the cup 8, a hole is formed at the center of the cup 8, one end (an upper tip) of the rotational shaft 9 is inserted into the hole, and the end of the rotational shaft 9 is fixed by a spin caulking, etc. Therefore, when the rotational shaft 9 rotates, the cup 8 including the permanent magnet 7 on the inner portion rotates with the rotational shaft 9. In this case, the cup 8 is not separate, and the cup 8 may be included in the rotational shaft 9 at first.

Another end (lower end portion) of the rotational shaft 9 fixed with the cup 8 including the permanent magnet 7 is inserted into the bushing 13, and the rotational shaft 9 is securely supported by the bushing 13. Under assembled condition of the sensor 10, after the rotational shaft 9 is mounted on the housing 11, the holder 1 is covered so as to cover the entire cup 8 from the upper portion of the cup 8. The housing 11 and the holder 1 is fixed by two nail portions 1i formed so as to oppose each other on a cylindrical outer surface of the holder 1, and the two nail portions fit in a projecting portion (not shown) formed opposed at a position corresponding with the nail portion 1i of the holder 1 on the outer surface of the housing 11. When the rotational shaft 9 is rotatably supported by the housing 11 and the holder 1 as shown in FIG. 2, as the seal member 20 is clipped by the inner wall of the holder 1, waterproofing of the sensor 10 is established, and the inner space (opening 1h) in which the cup 8 is disposed and can be sealed. As the rotational shaft 9 is rotatably supported by the bushing 13 on a side surface, the center of the rotational shaft 9 can be stabilized. Further, when the holder 1 and the housing 11 are assembled together, a bottom portion 8b of the cup 8 connects with the end portion 11g of a top end of the boss portion of the housing 11 in the axial direction and an end portion 13a in the axial direction of the bushing 13. Furthermore, on the upper portion 8a of the cup 8, the movement in the axial direction of the rotational shaft 9 is restricted by a plurality of restricting portion 1r formed on the upper portion of the opening 1h of the holder 1 as shown in FIG. 2. In this case, the restricting portion 1r is formed on a rotational pass of the upper end portion 8a of the cross-sectional U-shaped cup 8. In this embodiment, a movement in the axial direction is restricted by means of connecting the restricting portion 1r with the upper end portion 8a. Thereby, a ring projection on the rotational pass is formed. Further, the restricting portion 1r is formed on the rotational pass at a plurality of points (e.g., three points).

In this embodiment, the restricting portion 1r is formed on the holder 1 at 15 contacting at three points with the upper portion 8a of the cup 8, but does not limit the position and number of the restricting portion 1r. However, if a number of the restricting portion 1r is increased, a friction force increases under a rotation of the rotational shaft 9, thereby a rotation of the rotational shaft 9 causes an adverse effects. Further, if a number of the restricting portion 1r is decreased, it causes the rotational shaft 9 to not be securely rotatably supported; therefore, the restricting portion 1r may be formed at three to five points on the holder 1.

That is to say, when the holder 1 fits with the housing 11, the friction is not nearly as great as the cup 8 fixed with the rotational shaft 9 contacting with a spherical surface of the projection at the bottom portion 8b and 1a. Further, the movement in the axial direction of the rotational shaft 9 is restricted by the holder 1, a position determination which apart from the Hall element 5 at an opposed position against the Hall element 5 is established by the inner surface of the bushing 13.

After the rotational shaft 9 is inserted into the housing 11, the opening of the concave portion 11d of the housing 11 is sealed by a seal member 19. A tip of the rotational shaft 9 forms a screw portion, and a base of the screw portion forms two flat surfaces in parallel. A lever 12 including a hole with two flat surfaces is fixed with the rotational shaft 9. The lever 12 is fixed with the rotational shaft 9 by a screw or a bolt etc. The lever 12 connects with the detected object.

By such a construction, the location of the rotational shaft 9 in the axial direction is established by the bushing 13 and the restricting portion 1r formed on the holder 1, a groove process for the rotational shaft 9, a clip, a ring member, etc., unlike the conventional construction are no longer needed, and thus the number of sensor parts can be reduced. Thus, accuracy of the detecting a location as the sensor 10 can be improved, such that the sensor is less costly.

Next, an operation of the sensor 10 will be explained hereinafter. When the detected object moves in a rotational direction, the lever 12 fixed with the detected object is rotated. Then, the rotational shaft 9 is rotated with the lever 12 by a rotational operation of the lever 12, and the ring shaped permanent magnet 7 fixed with the inner surface of the cup 8 fixed with the upper portion of the rotational shaft 9 is rotated. As the permanent magnet 7 is magnetized N-pole and S-pole alternately in a peripheral direction, a parallel magnetic field from the magnetic pole is generated. Under this condition, when the permanent magnet 7 is rotated by the rotational operation of the detected object, the magnetic field at the location of the Hall element 5 is changed. Intensity of the magnetic field is detected by the Hall element 5 fixed with the member (e.g., substrate 4) of the non-rotational side. Thereby, outputted voltage from the Hall element 5 is changed according to the rotational condition of the lever 12. The outputted voltage generated by the change of the magnetic field passes through the circuit pattern (not shown) formed on the substrate 4 and terminal 3 from the substrate 4, the outputted voltage is transmitted to the terminal 2, and the outputted voltage as a sensor signal from the terminal 2 of the connector 1CN is outputted to the outside of the sensor 10.

This invention is not limited to the above-mentioned embodiment, it may be changed as follows: A low friction circlip may be disposed between the cup 8 and the holder 1 so as to decrease friction force between the cup 8 and the holder 1 under the rotation of the rotational shaft 9. Further, though the bushing 13 is needed when the sensor 10 operates repeatedly, the sensor 10 may eliminate the bushing 13 when the sensor 10 does not operate repeatedly.

According to the present invention, the movement of the rotational shaft 9 (rotational member) in the axial direction can be restricted by the housing 11 for supporting the rotational shaft 9 rotatably and restricting one movement of the rotational shaft 9 in an axial direction. The holder 1 contacts an end portion of the rotational shaft 9 at a plurality of contact points and restricts the movement of the rotational shaft 9 in the axial direction. Thus, a groove process on the rotational shaft 9 and clip etc. does not need to restrict the movement of the rotational shaft 9 in the 5 axial direction as the conventional sensor; therefore, the sensor can less costly.

In this case, as the rotational shaft 9 includes the cup 8 (magnet supporting portion) for supporting a permanent magnet 7, the holder 1 including an opening 1h, 1f with which the rotational shaft 9 is disposed, the restricting portion 1r for contacting with an end portion of the cup 8 in the axial direction on an inner surface of the opening 1h, if of the holder 1, one movement of the rotational shaft 9 in the axial direction is restricted by the end portion of the housing 11 in the axial direction. Another movement which is not restricted by the housing 11 is restricted by the restricting portion 1r in the opening 1h, 1f of the holder 1, and the movement of the rotational shaft 9 in the axial direction can be restricted by a simple construction.

Further, the rotational shaft 9 restricts the axial direction movement so as to contact the end portion of the cup 8 with the housing 11. Parts of the sensor do not increase movement in the axial direction of the rotational shaft 9 and are restricted by a simple construction.

The invention may be embodied in other specific forms without departing from the spirit or essential characteristic thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A non-contact rotational displacement detecting device comprising:

a rotational member;

a non-rotational member relatively rotatable with the rotational member;

a permanent magnet fixed with one of the rotational member and the non-rotational member;

a sensor portion fixed with the other of the rotational member and the non-rotational member and detecting rotational displacement on one plane between the rotational member and the non-rotational member;

the non-rotational member having a housing and a holder fixed with the housing, the housing supports the rotational member rotatably and restricting one of axial movements of the rotational member, and the holder forms a plurality of contact points for contacting with the rotational member in an axial direction and restricting the other of the axial movements of the rotational member.

2. A non-contact rotational displacement detecting device according to claim 1, wherein the rotational member includes a magnet supporting portion for supporting a permanent magnet, the holder includes an opening in which the rotational member is received, and a restricting portion for contacting with an end portion of the magnet supporting portion in the axial direction is formed at an inner surface on the opening of the holder.

3. A non-contact rotational displacement detecting device according to claim 2, wherein an axial movement of the rotation member is restricted by the magnet supporting portion supported between the restricting portion and the end of the housing.

* * * * *